United States Patent [19]

Kulkarni et al.

[11] 4,408,500
[45] Oct. 11, 1983

[54] RIMMED AND EDGE THICKENED STODOLA SHAPED FLYWHEEL

[75] Inventors: Satish V. Kulkarni, San Ramon; Richard G. Stone, Oakland, both of Calif.

[73] Assignee: The United States of America as represented by the U.S. Department of Energy, Washington, D.C.

[21] Appl. No.: 190,306

[22] Filed: Sep. 24, 1980

[51] Int. Cl.³ ............................................. F16C 15/00
[52] U.S. Cl. ....................................................... 74/572
[58] Field of Search ........................................... 74/572

[56] References Cited

U.S. PATENT DOCUMENTS 3,496,799  2/1970  Call ......................................... 74/572
3,602,067  8/1971  Wetherbee ............................. 74/572

FOREIGN PATENT DOCUMENTS 156072  11/1904  Fed. Rep. of Germany ........ 74/572

Primary Examiner—Kenneth Dorner
Attorney, Agent, or Firm—Gary C. Roth; L. E. Carnahan; Richard G. Besha

[57] ABSTRACT

A flywheel (10) is described that is useful for energy storage in a hybrid vehicle automotive power system or in some stationary applications. The flywheel (10) has a body (15) composed of essentially planar isotropic high strength material. The flywheel (10) body (15) is enclosed by a rim (50) of circumferentially wound fiber (2) embedded in resin (3). The rim (50) promotes flywheel (10) safety and survivability. The flywheel (10) has a truncated and edge thickened Stodola shape designed to optimize system mass and energy storage capability.

4 Claims, 6 Drawing Figures

RIMMED AND EDGE THICKENED STODOLA SHAPED FLYWHEEL

The United States Government has rights in this invention pursuant to Contract No. W-7405-ENG-48 between the United States Department of Energy and the University of California for the performance of energy research and development work at the Lawrence Livermore Laboratory.

BACKGROUND OF THE INVENTION

The invention described herein relates generally to flywheels, and more particularly to flywheels useful for energy storage as could be used in hybrid vehicle automotive power systems or in some stationary applications.

Prompted by recent national concern for energy conservation, there has been a substantial rebirth of interest in the technology of flywheels. Flywheels may be of use in energy storage systems and/or in land vehicle propulsion systems, inter alia. In particular, flywheels may be useful in power systems for hybrid automotive vehicles. Incorporating a flywheel in a battery powered vehicle may not only conserve energy but may also provide necessary acceleration and hill climbing performance.

Flywheels function as reservoirs of stored rotational kinetic energy. As rotational energy is withdrawn from a spinning flywheel, its angular speed decreases; as rotational energy is given to a flywheel, its angular speed increases. The kinetic energy of a flywheel as it rotates about its axis of symmetry is proportional to its moment of inertia multiplied by the square of its angular speed. The moment of inertia of a flywheel about its axis of symmetry depends upon the distribution of its mass. The angular speed of a flywheel cannot be increased without limit; at some angular speed, somewhere within the flywheel, the maximum allowable stress will be exceeded and the flywheel will permanently deform or, more probably, rupture and fly apart. Thus, other factors being equal, flywheels should be constructed of high strength material. Additionally, the energy per unit mass capable of being stored by a flywheel composed of an isotropic material would be maximized if the flywheel were so configured that, at rupture, its planar stresses were equal over its entire volume. This has been called a condition of two-dimensional hydrostatic stress which may be expressed by the rupture condition, throughout the entire flywheel, that:

$$s_o = s_r = s_t$$

where
- $s_o$ = the rupture stress of the flywheel material, a constant
- $s_r$ = the radial stress, and
- $s_t$ = the tangential stress.

Such a configuration, which can only be approached in actual practice, was theoretically discovered for a hypothetical flywheel extending to infinite radius by engineers of the de Laval Company in Sweden circa 1900. This flywheel configuration, called a Stodola shape or disk because it was first published in a book by A. Stodola ("Steam and Gas Turbines", The McGraw-Hill Book Company, Inc., New York, N.Y., 1927), has a shape given by:

$$t = t_o \exp - (\rho \omega^2 r^2 / 2 s_o),$$

where
- t = the thickness of the flywheel at radius r,
- $t_o$ = the thickness of the flywheel on the axis (r=0),
- $\rho$ = the material density of the flywheel, and
- $\omega$ = the angular speed of the flywheel at rupture.

The Stodola disk is also characterized by:

$$m\omega^2 = 2\pi t_o s_o = 2\pi t_o \rho v = 2\pi t_o \rho E/m$$

where
- m = the mass of the infinite Stodola disk,
- E = the total kinetic energy in the Stodola flywheel at rupture, and
- $v$ = the ratio $s_o/\rho$ or E/m, the energy density in the Stodola flywheel at rupture.

Consequently, the theoretical maximum energy per unit mass that a flywheel composed of a planar isotropic material can store, and which could be stored by an infinite Stodola disk if one could be constructed, is given by the ratio of the stress at rupture to the density of the material of which the flywheel is composed.

Constructable flywheel shapes have been proposed that possess good energy density storage capability. These shapes are related to the Stodola shape. For example Call, in U.S. Pat. No. 3,496,799, discloses the use of a shaped energy storage flywheel having decreasing thickness as one moves toward the circumference of the flywheel. This flywheel has a truncated Stodola shape and is uncompensated for its failure to achieve planar stress equality in its peripheral regions.

The maximum strength to density ratio can be quite high for composites of high strength fibers (composed, for example, of various graphite compounds or glasses) embedded in various bonding materials such as epoxy resins. Because of this, composite flywheels were developed. Most of the composites of which flywheels have been constructed have all fibers lying parallel to one another. Such unidirectional composites are characterized by being very strong in the direction of the fibers, but, because of the relative weakness of the bonding materials, only about 1 or 2 percent as strong in the directions perpendicular to the fibers. Therefore, in order to properly utilize unidirectional composites in flywheel construction planar stress equality is undesirable and designs based on the Stodola shape are inappropriate. U.S. Pat. No. 4,028,962 to Nelson teaches shaped designs for flywheels composed of anisotropic materials that include non-monotonic thickness variation as radial distance increases. Also see Christensen and Wu, "Optimal Design of Anisotropic (Fiber-Reinforced) Flywheels", J. Composite Materials, 11, (1977) 395. Optimized anisotropic flywheel designs are unappealing because they tend toward either zero or infinite thickness along their axes of symmetry.

Recent work involving the application of high strength fiber composites in flywheel construction was presented by Satish V. Kulkarni at the "1979 Mechanical and Magnetic Energy Storage Contractors' Review Meeting", October 19-22, 1979 at Washington D.C. This material is published in, "Composite-Laminate Flywheel-Rotor Development Program", publication number UCRL-83554, by the Lawrence Livermore Laboratory of the University of California.

SUMMARY OF THE INVENTION

It is therefore an object of the invention to provide a flywheel composed of a planar isotropic, or a nearly planar isotropic, material and configured to be able to store nearly the maximum kinetic energy per unit mass which the material of which the flywheel is composed is capable of storing.

Another object of the invention is to provide a flywheel that has a benign failure mode.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the flywheel of this invention may comprise a body having a shape given by:

$$t = t_o \exp - Cr^2 \text{ where } 0 \leq r \leq \left[\frac{1}{C} \ln(t_o/T)\right]^{\frac{1}{2}}$$
$$t = T \quad \text{where } \left[\frac{1}{C} \ln(t_o/T)\right]^{\frac{1}{2}} < r \leq R$$

wherein
- r = the perpendicular distance from the axis of rotation,
- t = the thickness of the body at radius r,
- $t_o$ = the thickness of the body on the axis (r=0),
- T = the thickness of the body where it is edge thickened,
- R = the maximum radial dimension of the body, and
- C = an arbitrary positive constant of dimensionality reciprocal length squared.

Preferably the flywheel of this invention as described hereinabove may also comprise a rim confined to the radial dimensions $R < r \leq R'$. The rim may have the shape given by:

$$t = 0 \quad \text{where } 0 \leq r \leq R, \text{ and where } r > R'$$
$$t = T \quad \text{where } R < r \leq R'.$$

Preferably the rim may be formed by circumferentially winding a fiber/resin composite.

The benefits and advantages of the present invention, as embodied and broadly described herein, include, inter alia, a flywheel configured to be able to store nearly the maximum kinetic energy per unit mass that the planar isotropic or nearly planar isotropic material of which the flywheel is composed is capable of storing, that has a benign failure mode, that is useful for energy storage, and that could be used in hybrid vehicle automotive power systems or in some stationary applications.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Figure 1:
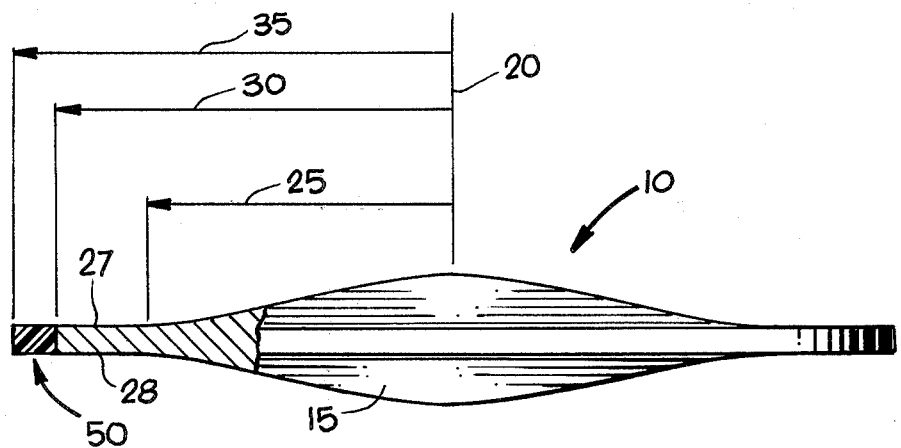
FIG. 1 is an elevation view, partially in cross section, of a flywheel made in accordance with the invention.
Figure 2:
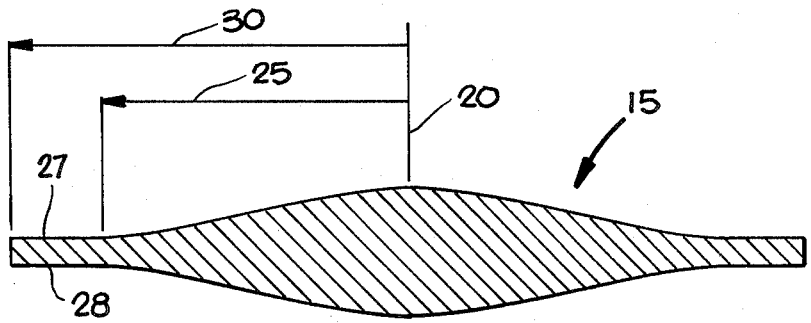
FIG. 2 is an elevation view, in cross section, of the body of the flywheel shown in FIG. 1.
Figure 3:
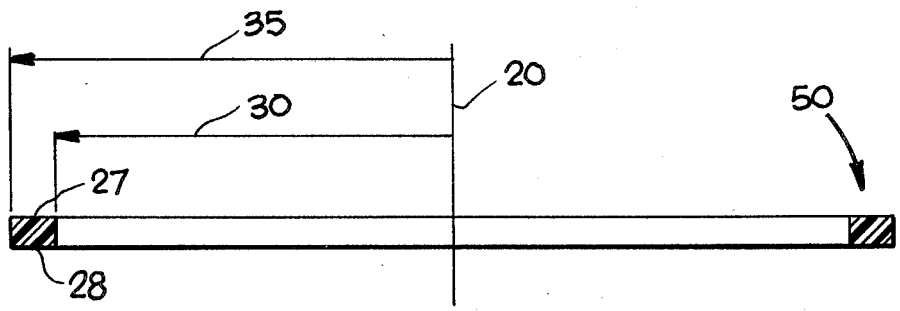
FIG. 3 is an elevation view, in cross section, of the rim of the flywheel shown in FIG. 1.
Figure 4:
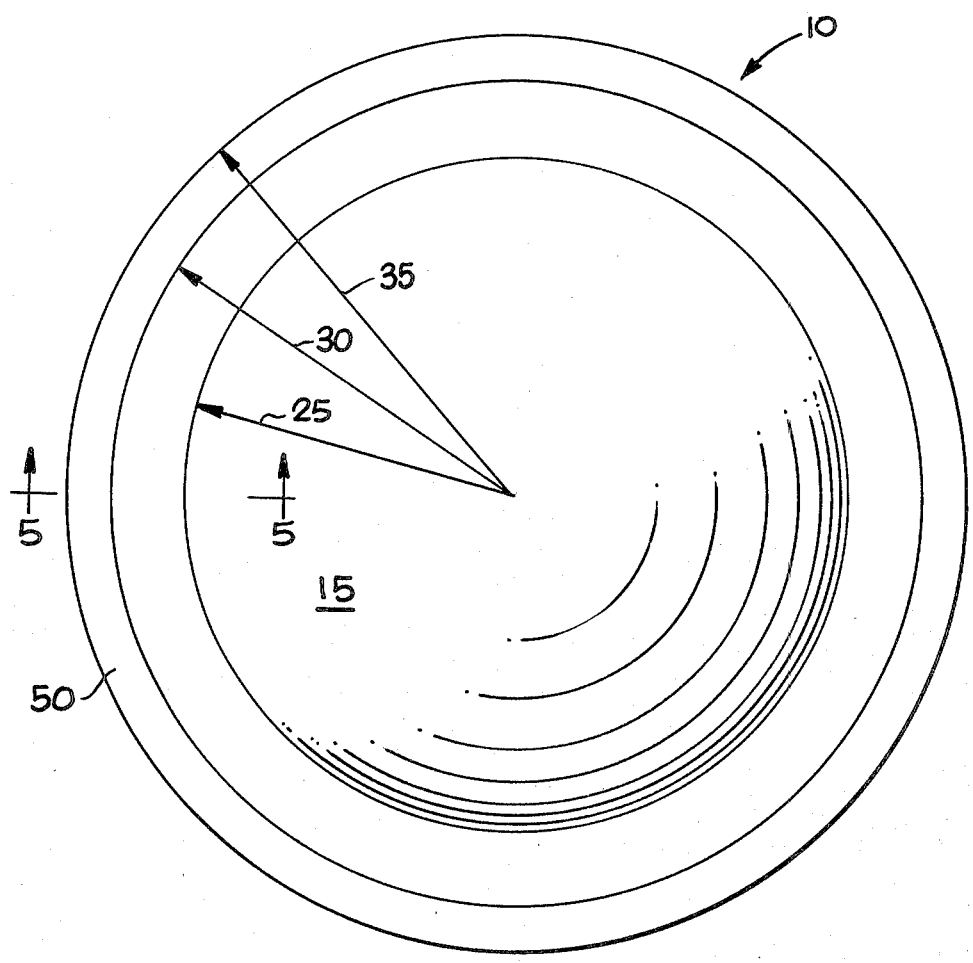
FIG. 4 is a plan view of the flywheel shown in FIG. 1.

Reference will now be made in detail to the present preferred embodiment of the invention, an example of which is illustrated in the accompanying drawings. In FIGS. 1 and 4 a flywheel 10 is composed of a body 15 surrounded by a rim 50. The body 15 and the rim 50 are each shown separately in FIGS. 2 and 3, respectively. The body of the flywheel has the characteristic Stodola shape from the axis of rotation 20 to the radius denoted by the reference numeral 25. The remainder of the flywheel, to the outer radius denoted by reference numeral 35, is shaped as a plane annular disk bounded by parallel planar surfaces 27 and 28. The outer surface of the flywheel, at the radius 35, is cylindrical. The plane annular disk includes both the outer portion of the body of the flywheel, between the radii denoted by reference numerals 25 and 30, and the rim of the flywheel, between the radii denoted by reference numerals 30 and 35. The flywheel of FIGS. 1 and 4 has a truncated and edge thickened Stodola shape. A Stodola shape truncated at R may be mathematically expressed by $$t = t_o \exp - (\rho\omega^2 r^2/2s_o) \text{ where } 0 \leq r \leq R$$
$$t = 0 \quad \text{where } r > R.$$

If C is defined by $$C = \rho\omega^2/2s_o,$$

the above formula may be more simply expressed as $$t = t_o \exp - Cr^2 \text{ where } 0 \leq r \leq R$$
$$t = 0 \quad \text{where } r > R.$$

A Stodola shape edge thickened to the thickness T may be mathematically expressed by $$t = t_o \exp - Cr^2 \text{ where } 0 \leq r \leq \left[\frac{1}{C} \ln(t_o/T)\right]^{\frac{1}{2}}$$
$$t = T \quad \text{where } r > \left[\frac{1}{C} \ln(t_o/T)\right]^{\frac{1}{2}}.$$

The value of r at which the transition from Stodola shape to plane annular disk occurs is obtained by solving the equation $$T = t_o \exp - Cr^2$$

for r. A Stodola shape both truncated at R and edge thickened to the thickness T may be mathematically expressed by $$t = t_o \exp - Cr^2 \quad \text{where } 0 \leq r \leq \left[\frac{1}{C} \ln(t_o/T)\right]^{\frac{1}{2}}$$

$$t = T \quad \text{where } \left[\frac{1}{C} \ln(t_o/T)\right]^{\frac{1}{2}} < r \leq R$$

$$t = 0 \quad \text{where } r > R.$$

The amount of edge thickening of a truncated and edge thickened Stodola shape may be quantitatively expressed as the ratio of T, the thickness of the shape in the plane annular disk region, to the thickness which the shape would have at R if the shape were not edge thickened. This ratio may be expressed as $$T/(t_o \exp -CR^2)$$

or $$(T/t_o) \exp CR^2.$$

For a Stodola shape which is truncated but not edge thickened this ratio has the value of 1, or unity. At the other extreme, for a Stodola shape which is truncated and edge thickened to the extent that the plane annular disk region embraces the entire structure, this ratio has the value of $$\exp CR^2$$

because, in this situation, $$T = t_o.$$

Therefore, the quantitative amount of edge thickening of a truncated and edge thickened Stodola shape may take any value between 1 and $\exp CR^2$. Truncated and edge thickened Stodola shaped flywheels have improved energy storage properties even without an outer rim.

An infinite Stodola flywheel is a hypothetical concept that cannot actually be constructed. However, flywheels can be constructed as truncated Stodola disks. A truncated Stodola shaped flywheel has less mass than its corresponding infinite Stodola flywheel. Furthermore, a truncated Stodola shaped flywheel rotating at $\omega$, the critical speed at which its corresponding infinite Stodola disk would rupture, has an energy density less than the energy density of its corresponding infinite Stodola flywheel at rupture which is $s_o/\rho$, the maximum theoretically possible. Of course, the angular speed of rupture of a truncated Stodola flywheel is always greater than $\omega$, the angular speed of rupture of its corresponding infinite Stodola flywheel. This is because the removal of centrifugal forces from the truncated system concomitant with the removal of truncated mass reduces, at any angular speed, the stress at any location within the truncated Stodola flywheel to a value below that at the same location within the corresponding infinite Stodola flywheel. Consequently, when a truncated Stodola flywheel is rotating at $\omega$, the angular speed at which its corresponding infinite Stodola disk would rupture, the stress at every location within the truncated Stodola flywheel is less than $s_o$, the rupture stress of the flywheel material. Therefore, the truncated Stodola flywheel may be operated at angular speeds exceeding $\omega$ until, at some location within the flywheel, the stress level of $s_o$ is attained whereupon the truncated flywheel will rupture. Nevertheless, the stored energy density at rupture of the truncated Stodola flywheel is always less than the stored energy density at rupture of the infinite Stodola flywheel because planar stress equality is not maintained over the entire volume of the truncated flywheel.

Thus, the total energy capable of being stored by a truncated Stodola flywheel, which is the product of flywheel mass times energy density at rupture, because of the reduction in both of its composite factors, is less than that for its corresponding infinite Stodola flywheel.

Figure 6:
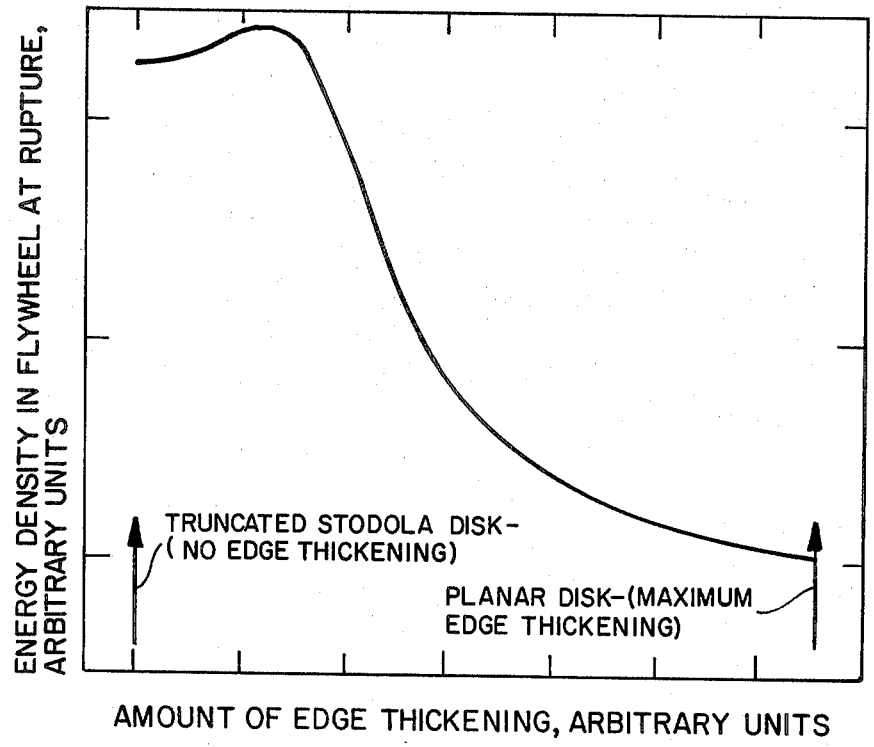
FIG. 6 is a graphic view of the typical effect of thickening the outer edge of a Stodola shaped flywheel, indicating the energy efficiency of the flywheel as a function of the amount of thickening of the outer edge of the flywheel.

The angular speed of rupture of a truncated Stodola flywheel cannot be calculated in closed form by simple theory. These calculations, however, can be performed by computers utilizing standard computer codes, many of which are well known in the art. Furthermore, these calculations can be performed for many flywheel shapes other than truncated Stodola disks. In particular, such calculations have been performed for truncated and edge thickened Stodola shaped flywheels. As mentioned above, a truncated Stodola flywheel may be edge thickened in varying amounts. A small amount of edge thickening only effects flywheel shape near the outer circumference. At the other extreme, a large amount of edge thickening results in a flywheel the shape of which approaches a planar disk of constant thickness. The results of flywheel computer calculations, as just described, display certain common features. First, both the mass and the energy density in the flywheel at rupture are calculated to be less for a truncated Stodola flywheel than for its corresponding infinite Stodola flywheel. As one proceeds to sequentially edge thicken any truncated Stodola flywheel, the mass of the resulting truncated and edge thickened Stodola flywheel sequentially increases. In fact, the resulting mass of a truncated and edge thickened Stodola flywheel can exceed that of its corresponding infinite Stodola flywheel. More important, however, is the behaviour of the calculated energy density at rupture for truncated and edge thickened Stodola flywheels as edge thickening increases. As shown in FIG. 6, as one sequentially edge thickens any truncated Stodola flywheel the value of the energy density in the flywheel at rupture increases to a maximum value and thereafter decreases, approaching the value for a planar disk of constant thickness. Thus, edge thickening a truncated Stodola flywheel serves at least two very useful purposes. First, edge thickening "restores" or "buys back" mass lost by virtue of truncation. Second, edge thickening can increase the energy density of the flywheel at rupture, the overall energy per unit mass which the flywheel can store. In other words, edge thickening can result in a flywheel both more massive and storing more energy per unit mass than a simply truncated Stodola shaped flywheel. It should also be observed that since at any angular speed edge thickening increases the internal system stress at all locations, the angular speed of rupture of a truncated and edge thickened Stodola flywheel is less than that of its corresponding simply truncated Stodola flywheel.

The invention disclosed herein may be incorporated into flywheels of any size. As applied in the preferred embodiment, the following example of specific dimensions is offered to illustrate application of the inventive principles disclosed herein to a specific flywheel. A flywheel composed of a planar isotropic, or nearly planar isotropic, material such as titanium of density approximately 4.54 gm/cm³ and shaped according to the mathematical expression $t = 2.54 \text{ cm} \exp - 0.00105 \text{ cm}^{-2} r^2$ where $0 \leq r \leq 19.70$ cm
$t = 1.69$ cm where $19.70 \text{ cm} < r \leq 26.65$ cm
$t = 0$ where $r > 26.65$ cm will have more mass and be capable of storing more energy per unit mass than the corresponding simply truncated Stodola shaped flywheel. In practice, the contour of the transition from the Stodola shaped region of the flywheel to the plane annular disk portion of the flywheel should be made continuous and smooth to preclude the formation of a potential location of high stress concentration. The dimensions of the preferred embodiment were chosen because they are realistic for current application in power systems for hybrid automotive vehicles. However, they should be taken as merely illustrative of a possible actual application.

In accordance with the invention, flywheels for use in hybrid vehicle automotive power systems or in some stationary applications should have a truncated and edge thickened Stodola shape. The actual final parameters of a flywheel conforming with the invention and possessing specific design characteristics are set by iterative computer calculations.

Figure 5:
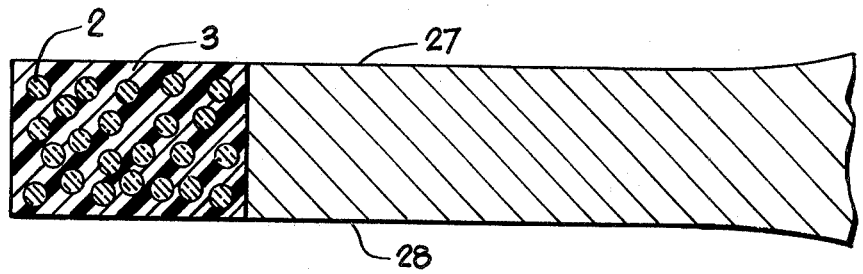
FIG. 5 is a partial elevation view, showing the material composition of the rim shown in FIG. 3.

FIGS. 1 and 4 show flywheel 10 surrounded by a rim. The rim 50 is shown separately in FIG. 3. As shown in FIG. 5, the rim of the flywheel is composed of circumferentially wound fiber 2, embedded in a resin 3. A purpose of the rim is to reduce radial stress in the peripheral portions of the body of the flywheel when the flywheel is rotating at high angular speeds. In accordance with the invention, the rim will preferably be separately formed and fitted to the body of the flywheel, but it could be directly wound thereon. The material properties of the components of the rim are selected so that the rim does not separate from the body of the flywheel at angular velocities below rupture. The radial width of the rim, contained between the radii 30 and 35, and the amount of edge thickening of the flywheel between parallel surfaces 27 and 28 are designed together by computer calculation to recover truncated mass and optimize the energy density at rupture of the flywheel. However, in general the ratio of the radial width of the rim of the flywheel to the axial thickness, or amount of edge thickening, of the rim of the flywheel should always be less than one. Because the rupture of some prior art flywheels has been sudden and catastrophic, one expects that as the angular speed of the flywheel is increased the rim will fail locally before the body of the flywheel, thus giving warning so that the flywheel can be safely stopped and recovered largely intact. Thus, addition of the rim to the body of the flywheel introduces a benign failure mode that promotes recovery during use, especially during developmental testing, and safety at all times.

It should be noted that other embodiments of the present invention are possible. For example, since the rim is composed of non-planar isotropic material, for some applications the rim might be constructed to be of non-uniform axial thickness rather than as a plane annular disk. Also, the rim could be directly wound into and upon a shallow indentation provided on the outer peripheral surface of the body of the flywheel so that under normal use the rim could not become detached from the body of the flywheel.

In accordance with the invention an energy storage flywheel is provided having a body enclosed by a rim of circumferentially wound fiber embedded in resin. The body and rim have a truncated and edge thickened Stodola shape designed to optimize system mass and energy storage requirements.

The foregoing description of a preferred embodiment of the invention has been presented for purposes of illustration and description. It is not intended to be exhaustive or to limit the invention to the precise form disclosed, and many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. A flywheel, which comprises:
   (a) a body shaped symmetrically about both an axis of rotation and a midplane perpendicular to the axis of rotation; and
   (b) said body having a thickness defined by the formula:

$$t = t_o \exp - Cr^2 \text{ where } 0 \leq r \leq \left[ \frac{1}{C} \ln(t_o/T) \right]^{\frac{1}{2}}$$

$$t = T \quad \text{where } \left[ \frac{1}{C} \ln(t_o/T) \right]^{\frac{1}{2}} < r \leq R$$

$$t = 0 \quad \text{where } r > R$$

wherein:
r = the perpendicular distance from the axis of rotation,
t = the thickness of said body at a distance r from, and measured parallel to, the axis of rotation,
$t_o$ = the thickness of said body at and along the axis of rotation,
T = the thickness of said body where said body is edge thickened,
R = the maximum radial dimension of said body, and
C = an arbitrary positive constant of dimensionality reciprocal length squared which relates to an infinite Stodola flywheel corresponding to said flywheel by equaling the expression $\rho\omega^2/2s_o$, wherein:
$\rho$ = the material density of said flywheel and said corresponding infinite Stodola flywheel,
$s_o$ = the material rupture stress of said flywheel and said corresponding infinite Stodola flywheel, and
$\omega$ = the angular speed at rupture of said corresponding infinite Stodola flywheel.

2. A flywheel, as recited in claim 1, further comprising:
   (a) a rim shaped symmetrically about both the axis of rotation and the midplane perpendicular to the axis of rotation; and
   (b) said rim having a thickness defined by the formula:

$$t = 0 \quad \text{where } 0 \leq r \leq R, \text{ and where } r > R'$$
$$t = T \quad \text{where } R < r \leq R'$$

wherein:

R' = the maximum radial dimension of said rim.

3. A flywheel, as recited in claim 1, further comprising
a rim shaped symmetrically about both the axis of rotation and the midplane perpendicular to the axis of rotation.

4. A flywheel, as recited in claim 2 or 3, further comprising:
(a) said rim formed by circumferentially winding a fiber/resin composite.

* * * * *